United States Patent
Jaradi et al.

(10) Patent No.: US 10,543,807 B2
(45) Date of Patent: Jan. 28, 2020

(54) ENERGY ABSORBING RESTRAINT SYSTEM

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 15/861,609

(22) Filed: Jan. 3, 2018

(65) Prior Publication Data
US 2019/0202397 A1    Jul. 4, 2019

(51) Int. Cl.
*B60R 22/28*  (2006.01)
*B60R 22/195* (2006.01)

(52) U.S. Cl.
CPC .......... *B60R 22/28* (2013.01); *B60R 22/1953* (2013.01); *B60R 2022/281* (2013.01); *B60R 2022/286* (2013.01); *B60R 2022/289* (2013.01)

(58) Field of Classification Search
CPC ............ B60R 22/1952; B60R 22/1953; B60R 22/1954; B60R 22/1955; B60R 22/28; B60R 2022/1806; B60R 2022/281; B60R 2022/286; B60R 2022/289
See application file for complete search history.

(56) References Cited

U.S. PATENT DOCUMENTS

| | | | | |
|---|---|---|---|---|
| 5,366,245 A | * | 11/1994 | Lane, Jr. ............. | B60R 22/1955 280/806 |
| 5,564,748 A | * | 10/1996 | Kmiec ................ | B60R 22/1952 280/806 |
| 5,568,940 A | * | 10/1996 | Lane, Jr. ............. | B60R 22/1952 180/268 |
| 5,671,949 A | * | 9/1997 | Bauer ................. | B60R 22/1952 280/806 |
| 6,056,320 A | | 5/2000 | Khalifa et al. | |
| 6,250,720 B1 | * | 6/2001 | Wier ................... | B60R 22/1951 280/806 |
| 6,299,211 B1 | * | 10/2001 | Wier ................... | B60R 22/1952 280/741 |
| 6,419,271 B1 | * | 7/2002 | Yamada ............. | B60R 22/1952 280/801.1 |
| 6,877,776 B2 | * | 4/2005 | Ukita ................. | B60R 22/1952 280/806 |

(Continued)

FOREIGN PATENT DOCUMENTS

WO       199613409 A1    5/1996

*Primary Examiner* — Laura Freedman
(74) *Attorney, Agent, or Firm* — Frank A. MacKenzie; Bejin Bieneman PLC (57) ABSTRACT

A restraint system includes a housing defining a cavity tapering to an end and a plug disposed in the cavity. The plug is larger than the end of the housing. A seatbelt buckle is fixed relative to one of the housing and the plug and is moveable from a first position to a second position relative to the other of the housing and the plug. The plug is moveable relative to the housing toward the end during movement from the first position to the second position. One of the housing and the plug is plastically deformable by the other of the housing and the plug during movement from the first position to the second position.

20 Claims, 8 Drawing Sheets

(56) References Cited

U.S. PATENT DOCUMENTS

| | | |
|---|---|---|
| 7,784,831 B2 | 8/2010 | Dong |
| 8,091,923 B2 | 1/2012 | Dong |
| 9,168,890 B1 | 10/2015 | Jaradi et al. |
| 9,221,424 B2 * | 12/2015 | Jenny ................. B60R 22/1955 |
| 2017/0225649 A1 | 8/2017 | Jaradi et al. |
| 2018/0050658 A1 * | 2/2018 | Jaradi ................. B60R 22/1952 |
| 2019/0071053 A1 * | 3/2019 | Imanaka ................. B60R 22/44 |

* cited by examiner

ENERGY ABSORBING RESTRAINT SYSTEM

BACKGROUND

Vehicles include seatbelts for each of the seats. The seatbelt includes webbing that, when the seatbelt is buckled, extends across an occupant of the seat. An anchor attaches one end of the webbing to a seat frame. The other end of the webbing feeds into a retractor, which includes a spool that pays out and retracts the webbing. A clip slides freely along the webbing and, when engaged with a buckle, divides the webbing into a lap band and a shoulder band.

DETAILED DESCRIPTION

A restraint system includes a housing defining a cavity tapering to an end. A plug is disposed in the cavity and is larger than the end of the housing. A seatbelt buckle is fixed relative to one of the housing and the plug and is moveable from a first position to a second position relative to the other of the housing and the plug. The plug is moveable relative to the housing toward the end during movement from the first position to the second position. One of the housing and the plug is plastically deformable by the other of the housing and the plug during movement from the first position to the second position.

The restraint system may include a cable attached to the plug extending to an end spaced from the plug. The end of the cable may be external to the cavity.

The end of the housing may be disposed between the plug and the end of the cable.

The restraint system may include a vehicle body. The seatbelt buckle may be moveable from the first position to the second position relative to the vehicle body.

The end of the cable may be fixed to the vehicle body.

The restraint system may include a pretensioner fixed to the vehicle body. The end of the cable may be fixed to one of the pretensioner and the seatbelt buckle.

The pretensioner may include a linkage connected to one of the housing and the seatbelt buckle.

The housing may be fixed relative to the other of the pretensioner and the seatbelt buckle.

The housing may have a frustum shape.

The seatbelt buckle may be disposable in the cavity.

The end of the housing may include a wall extending across the cavity. The wall may include a hole extending into the cavity.

The restraint system may include a cable attached to the plug. The cable may extend from the plug through the hole in the wall.

The housing may include a stopper disposed between the plug and the end of the housing. The plug may be engageable with the stopper.

The plug may be hollow.

The plug may have a circular cross-section.

The plug may be a sphere.

The plug may be a cylinder.

The plug and the housing may be formed of different materials. The material of one of the plug and the housing may be more ductile than the material of the other of the plug and the housing.

The restraint system may include a webbing engageable with the seatbelt buckle.

The restraint system may include a clip slidably engaged with the webbing and releasably engageable with the seatbelt buckle.

Figure 1:
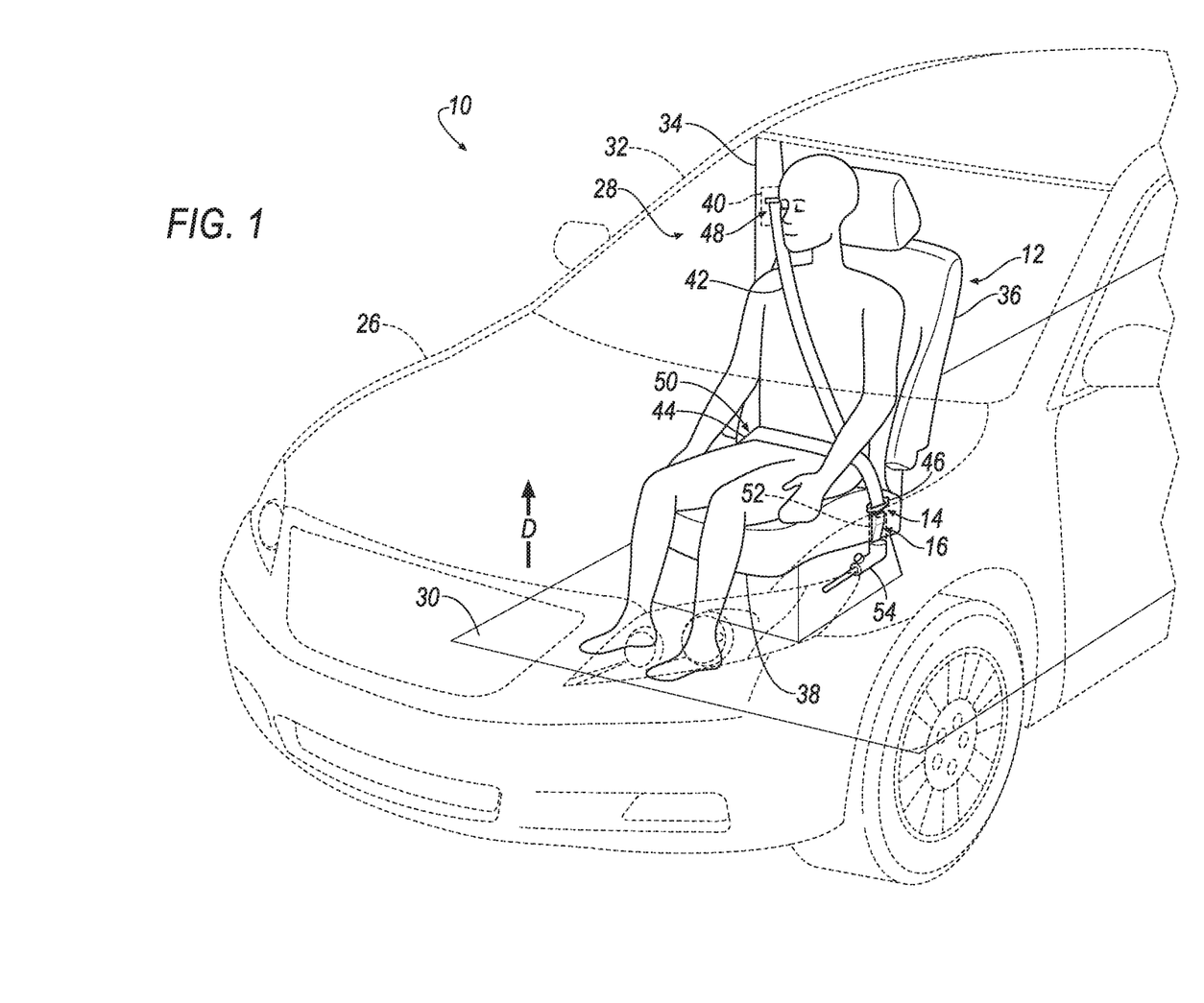
FIG. 1 is a perspective view of a vehicle including a restraint system.
Figure 2A:
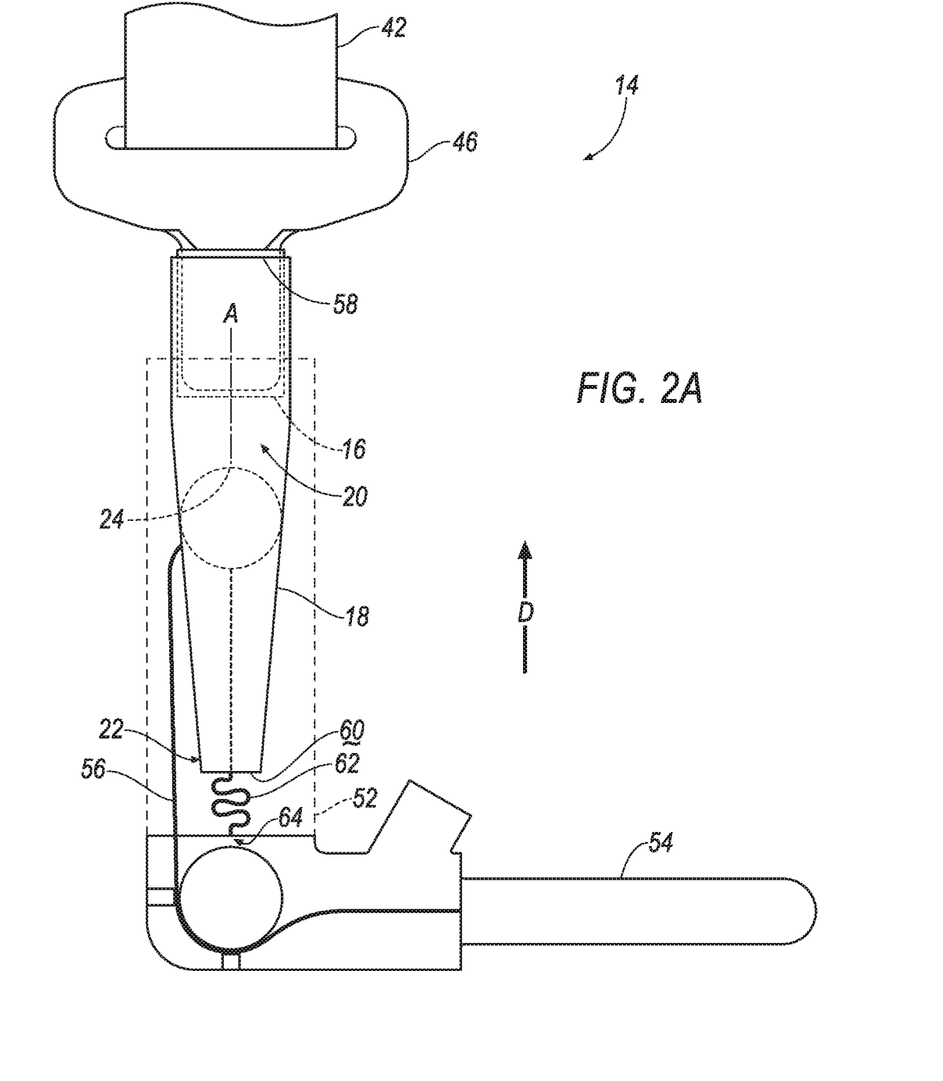
FIG. 2A is a side view of one embodiment of a seatbelt buckle in a first position fixed relative to a housing, and moveable relative to a plug engaged with the housing.
Figure 2B:
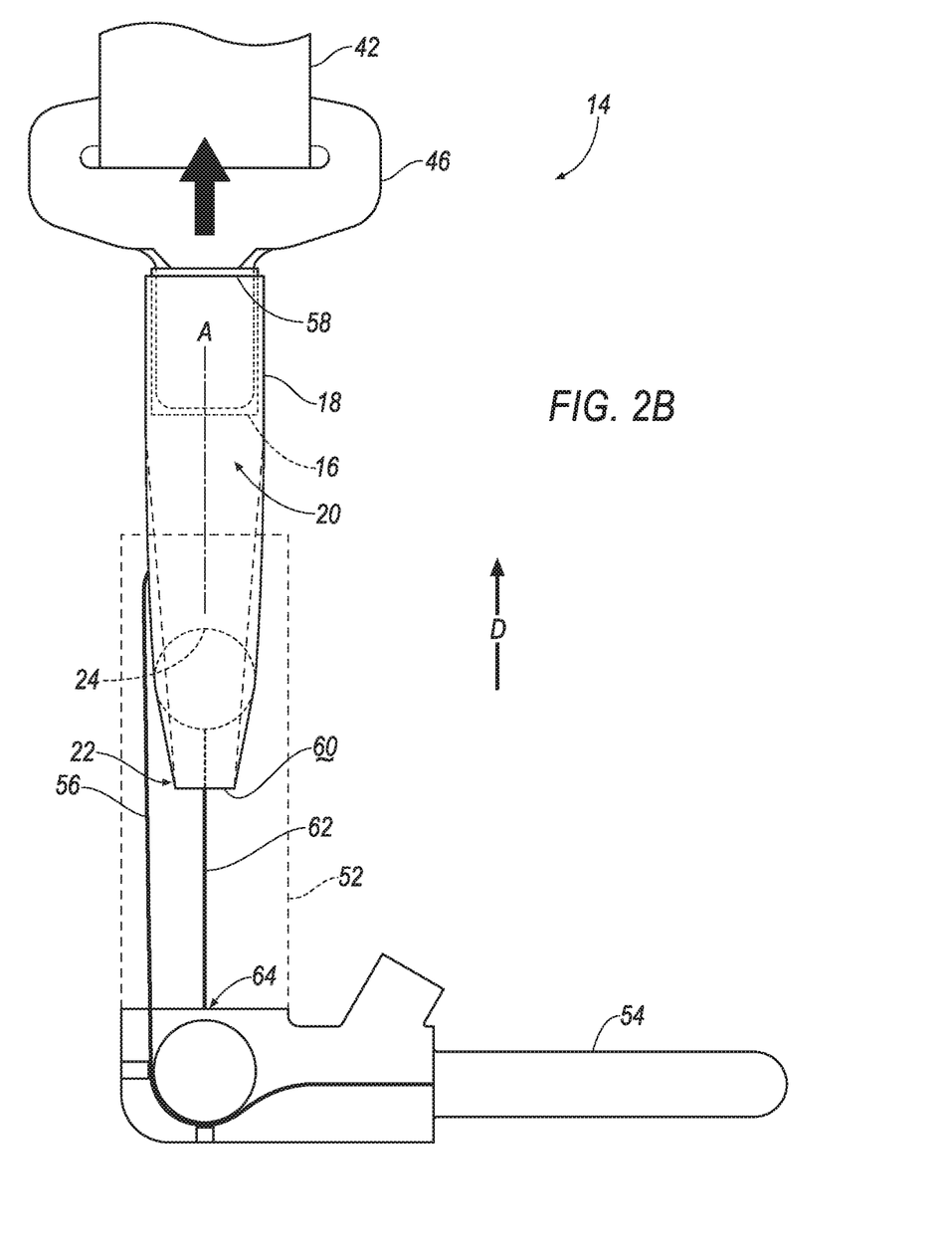
FIG. 2B is a side view of the embodiment in FIG. 2A of the seatbelt buckle in the second position with the housing plastically deformed by the plug.
Figure 2C:
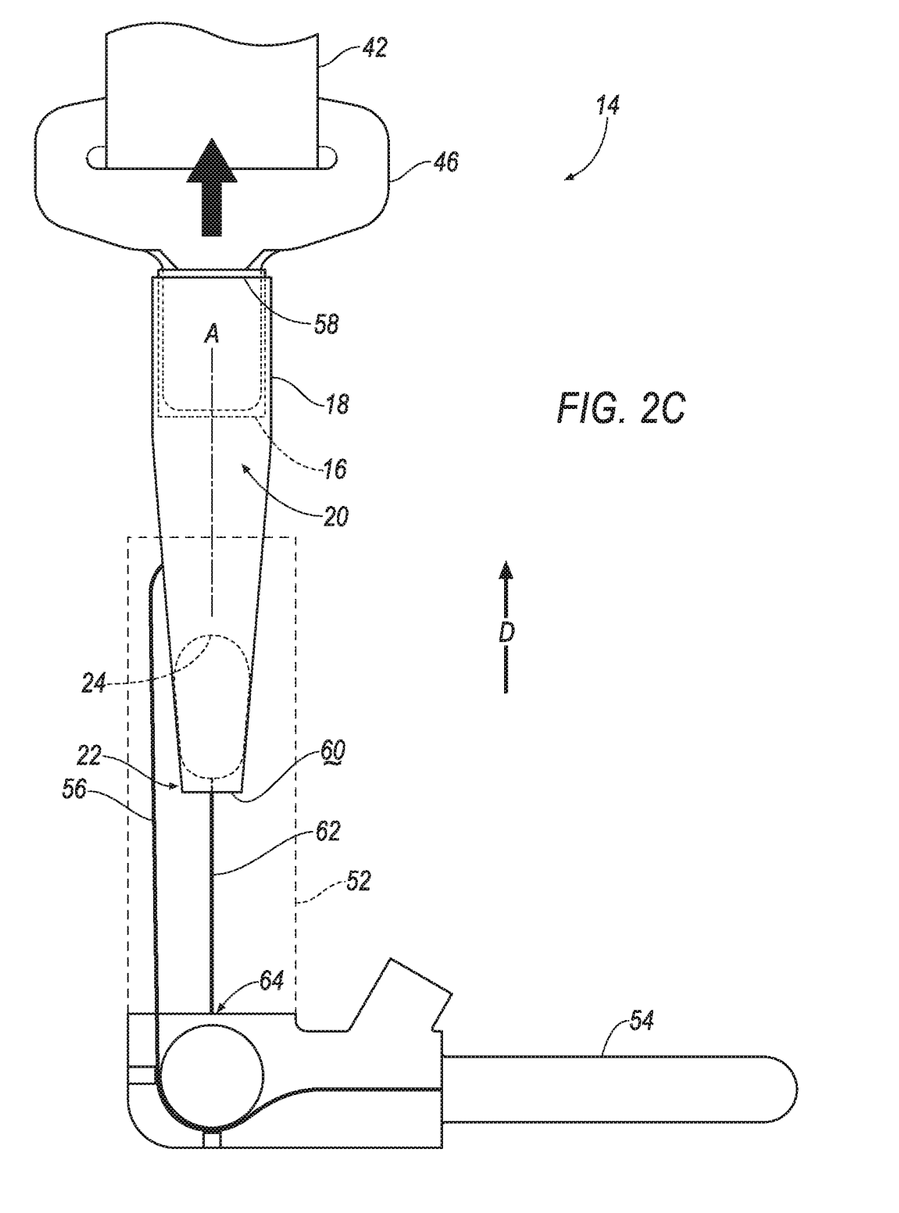
FIG. 2C is a side view of the embodiment in FIG. 2A of the seatbelt buckle in the second position with the plug plastically deformed by the housing.
Figure 3A:
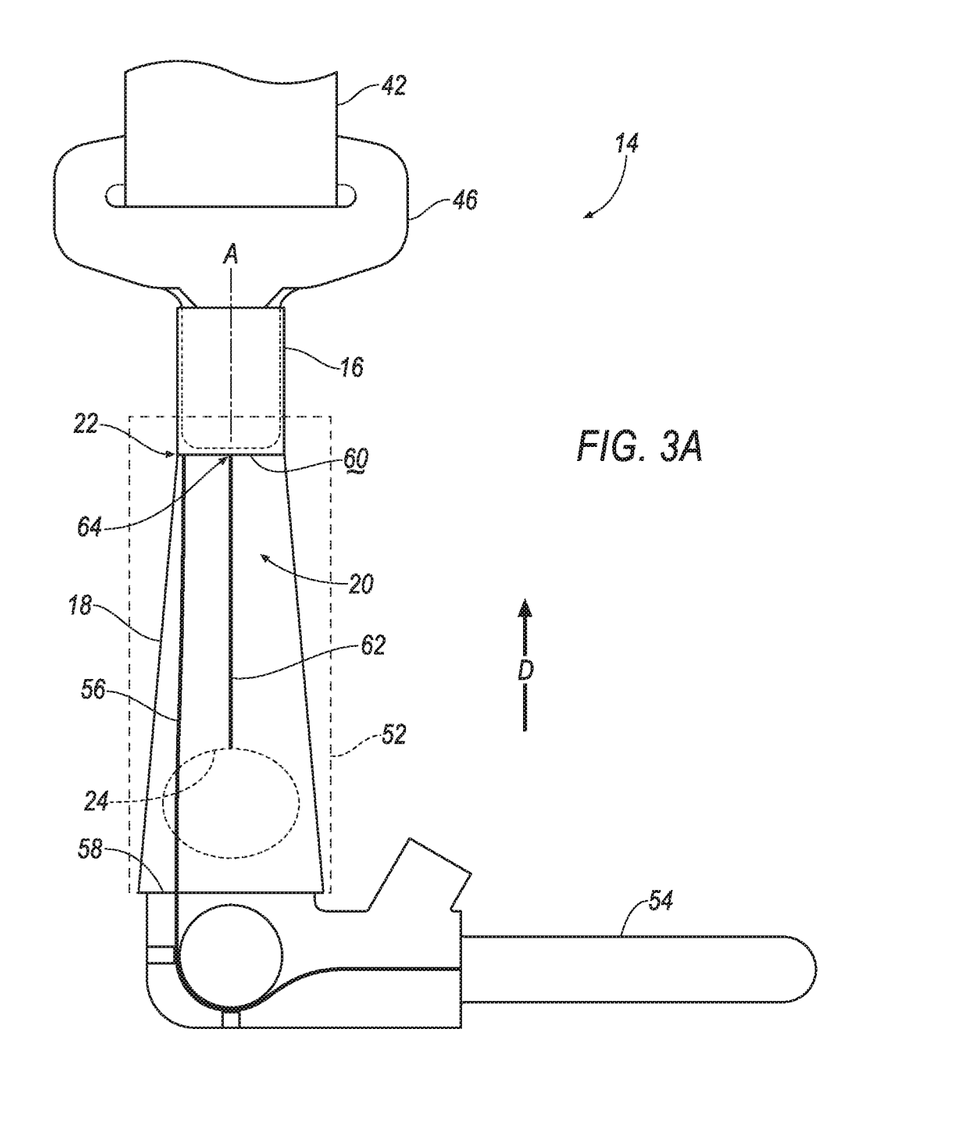
FIG. 3A is a side view of another embodiment of the seatbelt buckle in the first position fixed relative to the plug and moveable relative to the housing.

With reference to the Figures, wherein like numerals indicate like parts throughout the several views, a vehicle 10 including a restraint system 14 is generally shown. The vehicle 10 includes a seat 12 and the restraint system 14 has a seatbelt buckle 16 moveable relative to the seat 12. During a vehicle impact, the momentum of an occupant biases the occupant relative to the seat 12. For example, in a front impact, the momentum of the occupant may bias the occupant away from the seat 12. When the occupant moves away from the seat 12, the restraint system 14 may exert a force on the occupant to retain the occupant on the seat 12. During a front impact, the seatbelt buckle 16 may be moveable from a first position, as shown in FIGS. 2A and 3A, to a second position, as shown in FIGS. 2B-2C and 3B-3C, to allow for load-limiting when the restraint system 14 retains the occupant in the seat 12. Specifically, the seatbelt buckle 16 may be released a limited amount to give a limited amount of slack to webbing of the restraint system 14 during high loads to, as described below, to reduce chest compression of the occupant during the vehicle impact. During this release, the restraint system 14 may absorb energy to decrease the force exerted on the chest of the occupant during the vehicle impact.

The restraint system 14 includes a housing 18 defining a cavity 20 tapering to an end 22 and a plug 24 disposed in the cavity 20. The plug 24 is larger than the end 22 of the housing 18. The seatbelt buckle 16 is fixed relative to one of the housing 18 and the plug 24, i.e., the seatbelt buckle 16 moves, e.g., pulls, one of the housing 18 and the plug 24 relative to the other of the housing 18 and the plug 24 when the seatbelt buckle 16 moves from the first position to the second position, and is moveable from the first position to the second position relative to the other of the housing 18 and the plug 24. The plug 24 is moveable relative to the housing 18 toward the end 22 during movement of the seatbelt buckle 16 from the first position to the second position. One of the housing 18 and the plug 24 is plastically deformable by the other of the housing 18 and the plug 24 during movement of the seatbelt buckle 16 from the first position to the second position. As the seatbelt buckle 16 moves from the first position to the second position, the seatbelt buckle 16 causes one of the housing 18 and the plug 24 to move relative to the other of the housing 18 and the plug 24. When one of the housing 18 and the plug 24 moves relative to the other of the housing 18 and the plug 24, one of the housing 18 and the plug 24 is plastically deformed by the other of the housing 18 and the plug 24. By allowing one of the housing 18 and the plug 24 to plastically deform, the one of the housing 18 and the plug 24 absorbs energy from the occupant and may reduce chest compression of the occupant during the vehicle impact.

The vehicle 10 may, for example, be any suitable type of automobile. The vehicle 10 may include a vehicle body 26 defining a passenger cabin 28 to house occupants, if any, of the vehicle 10. The vehicle body 26 may include a floor 30 and a plurality of pillars 32, 34 extending in an upward direction D from the floor 30. For example, the pillars 32, 34 may include an A-pillar 32 and a B-pillar 34 spaced from the A-pillar 32, as shown in FIG. 1. The pillars 32, 34 may include additional pillars, e.g., a C-pillar (not shown).

With reference to FIG. 1, one or more seats 12 may be disposed at a front of the passenger cabin 28, e.g., between the A-pillar 32 and the B-pillar 34. In this situation, the seats 12 may be front seats. The passenger cabin 28 may include one or more rear seats (not shown) disposed behind the front seats. The passenger cabin 28 may also include third-row seats (not shown) at a rear (not numbered) of the passenger cabin 28, in which case the seats 12 may be second-row seats (not numbered) instead of or in addition to being front seats. As shown in FIG. 1, the seat 12 is a bucket seat, but the seats 12 may be other suitable types of seats, e.g., a bench seat.

With continued reference to FIG. 1, the seats 12 may include a seatback 36 and a seat bottom 38. The seatback 36 may be supported by the seat bottom 38 and may extend upwardly from the seat bottom 38. The seatback 36 may be stationary or movable relative to the seat bottom 38. The seatback 36, and/or the seat bottom 38 may be adjustable in multiple degrees of freedom. Specifically, the seatback 36, and/or the seat bottom 38 may themselves be adjustable, in other words, may have adjustable components within themselves, and/or may be adjustable relative to each other.

The seats 12 may be supported on the floor 30, i.e., directly on or through intermediate components. The seats 12 may, for example, be fixed to the floor 30 of the vehicle 10. In other words, the seat bottom 38 may be fixed to the floor 30. Alternatively, the seats 12, i.e., the seat bottom 38, may be slideably coupled to a support member (not shown) that is fixed to the floor 30. The seats 12 may be secured to the floor 30 of the vehicle 10 in any suitable manner, e.g., fasteners.

With reference to FIG. 1, the restraint system 14 may include a retractor 40, webbing 42 retractably payable from the retractor 40, an anchor 44 coupled to the webbing 42, and a clip 46 that engages the seatbelt buckle 16. The restraint system 14 may be disposed adjacent the seat 12. For example, the restraint system 14 is adjacent the front seat, as shown in FIG. 1. The restraint system 14, when fastened, retains the occupant on the seat 12, e.g., during sudden decelerations of the vehicle 10.

The retractor 40 may be attached to the vehicle body 26. For example, the retractor 40 may be attached to the B-pillar 34, as shown in FIG. 1. As another example, when the restraint system 14 is adjacent the rear seat, the retractor 40 may be attached to the C-pillar. Alternatively, the retractor 40 may be attached to the front seat, e.g., a frame (not shown) of the front seat. The retractor 40 may be attached to the vehicle body 26 in any suitable manner, e.g., fasteners.

The retractor 40 may include a locked state and an unlocked state. The retractor 40 in the locked state locks the webbing 42 to prevent the webbing 42 from extending from the retractor 40. In the unlocked state, the webbing 42 is selectively extendable from the retractor 40. The retractor 40 may, for example, be in the unlocked state by default, i.e., in the absence of a sudden deceleration. In other words, the retractor 40 may change from the unlocked state to the locked state during a sudden deceleration of the vehicle 10, i.e., the deceleration triggers components of the retractor 40 to change from the unlocked state to the locked state.

With reference to FIG. 1, the webbing 42 may include a first end 48 and a second end 50. The first end 48 of the webbing 42 is retractably engaged with the retractor 40, i.e., feeds into the retractor 40. The second end 50 of the webbing 42 may be attached to the anchor 44. The anchor 44 may, for example, be attached to the seat 12, e.g., the seat bottom 38. Alternatively, the anchor 44 may be attached to the vehicle body 26, e.g., the B-pillar 34, the floor 30, etc. The anchor 44 may be attached to the seat 12 in any suitable manner, e.g., with fasteners.

The webbing 42 extends continuously from the first end 48 to the second end 50. In other words, the webbing 42 is a one-piece unit from the first end 48 to the second end 50, and is not separable in a nondestructive manner between the first end 48 and the second end 50. The webbing 42 may be formed of a woven fabric, e.g., woven nylon.

The clip 46 may be slidably engaged with the webbing 42. The clip 46 may, for example, slide freely along the webbing 42 and selectively engage with the seatbelt buckle 16. In other words, the webbing 42 may be engageable with the seatbelt buckle 16. The clip 46 may, for example, be releasably engageable with the seatbelt buckle 16 from a buckled position to an unbuckled position. In the buckled position, the webbing 42 may be fixed relative to the seatbelt buckle 16. In other words, the seatbelt buckle 16 may prevent the webbing 42 from retracting into the retractor 40. In this situation, during the vehicle impact, the webbing 42 may pull the seatbelt buckle 16 from the first position to the second position. When the clip 46 is engaged with the seatbelt buckle 16, i.e., in the buckled position, the clip 46 may divide the webbing 42 into a lap band and a shoulder band. In the unbuckled position, the clip 46 may move relative to the seatbelt buckle 16. In other words, the webbing 42 may be retractable into the retractor 40.

The restraint system 14 may be a three-point harness, as shown in FIG. 1, meaning that the webbing 42 is attached at three points around the occupant when fastened: the anchor 44, the retractor 40, and the seatbelt buckle 16. The restraint system 14 may, alternatively, include another arrangement of attachment points.

With reference to FIG. 1, the restraint system 14 may include a buckle support 52 spaced from the anchor 44. For example, the seat 12 may be disposed between the buckle support 52 and the anchor 44. In other words, the buckle support 52 and the anchor 44 may be disposed on opposite sides of the seat 12. The buckle support 52 may be disposed adjacent the seat 12, e.g., the seat bottom 38. The buckle support 52 may, for example, be attached to the floor 30 of the vehicle 10. The buckle support 52 may extend upwardly from the floor 30, i.e., in the upward direction D. Alternatively, the buckle support 52 may be attached to the seat bottom 38 of the seat 12. The buckle support 52 may be formed of any suitable material, e.g., metal, plastic, etc. The buckle support 52 may be attached to the floor 30 of the vehicle 10 in any suitable manner, e.g., fasteners, welding, adhesive, etc.

With reference to FIGS. 2A-3C, the restraint system 14 may include a pretensioner 54 fixed to the vehicle body 26, e.g., the floor 30, the B-pillar 34, etc., for applying tension to the webbing 42 during the vehicle impact. Upon a sensed vehicle impact, the pretensioner 54 may be actuated to retract the webbing 42 to remove slack from the webbing 42 and to pull the occupant into the seat 12, i.e., exert the force on the occupant to retain the occupant on the seat 12. The pretensioner 54 may be fixed to the vehicle body 26, e.g., the floor 30, the B-pillar 34, etc., in any suitable manner, e.g., fasteners.

The pretensioner 54 may include a linkage 56 connected to one of the housing 18 and the seatbelt buckle 16. For example, the linkage 56 may be connected to the housing 18 when the housing 18 is fixed relative to the seatbelt buckle 16, as shown in FIGS. 2A-3B. As another example, the linkage 56 may be connected to the seatbelt buckle 16 when the seatbelt buckle 16 is moveable relative to the housing 18.

The linkage 56 may be of any suitable type such as a piston linkage, in which an explosive charge drives a piston attached to a cable, as shown in FIGS. 2A-3C; a ball-in-tube linkage, in which an explosive charge propels a ball or balls over a cogwheel connected to a cable; a mechanical linkage, in which a compressed spring attached to a cable is released; a rack and pinion linkage, in which an explosive charge propels a toothed rack bar to mesh with a gear connected to a cable, or any other suitable type. The linkage 56 may be connected to one of the housing 18 and the seatbelt buckle 16 in any suitable manner, e.g., fasteners, welding, ultrasonic welding, etc.

Figure 3B:
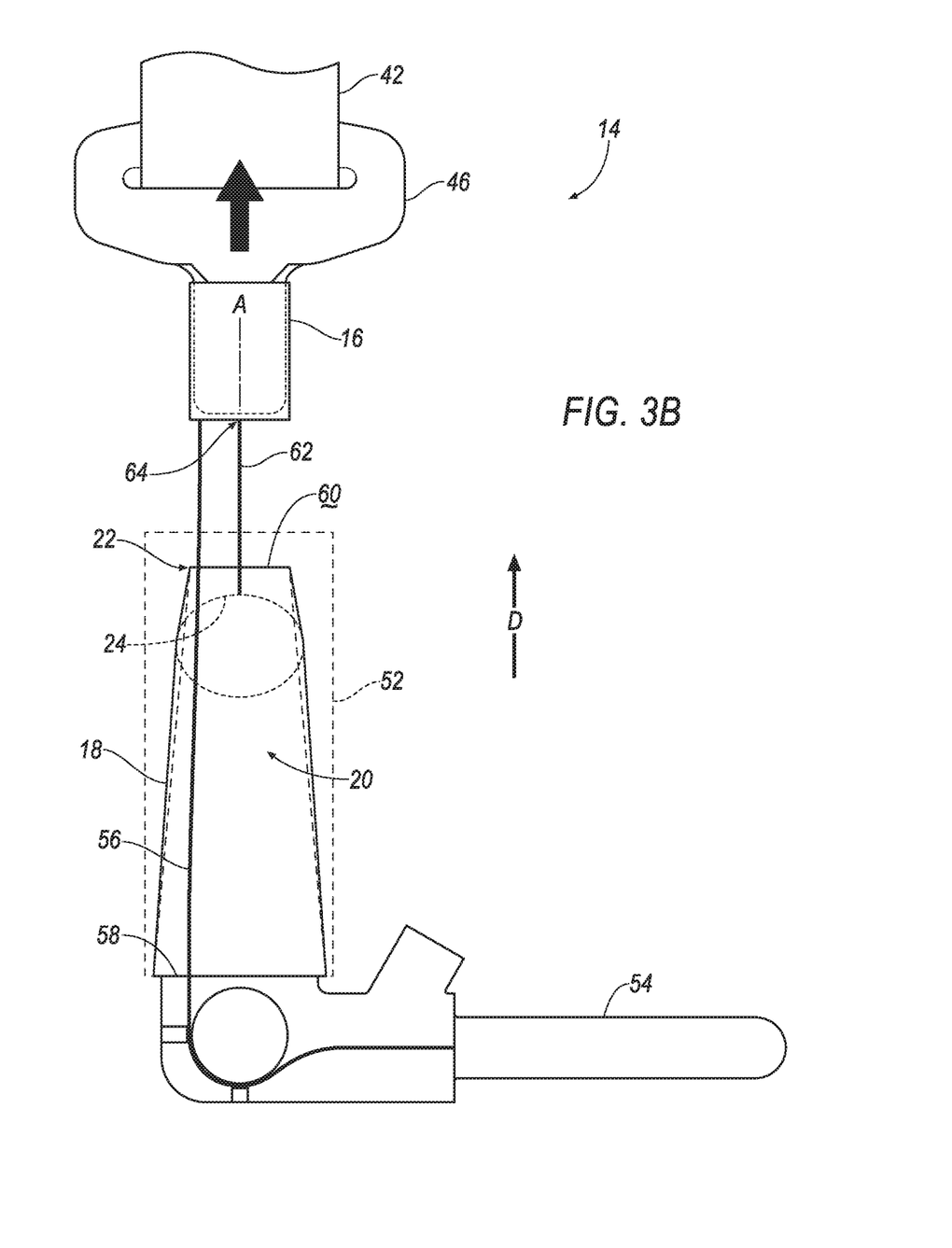
FIG. 3B is a side view of the embodiment in FIG. 3A the seatbelt buckle in the second position with the housing plastically deformed by the plug.
Figure 3C:
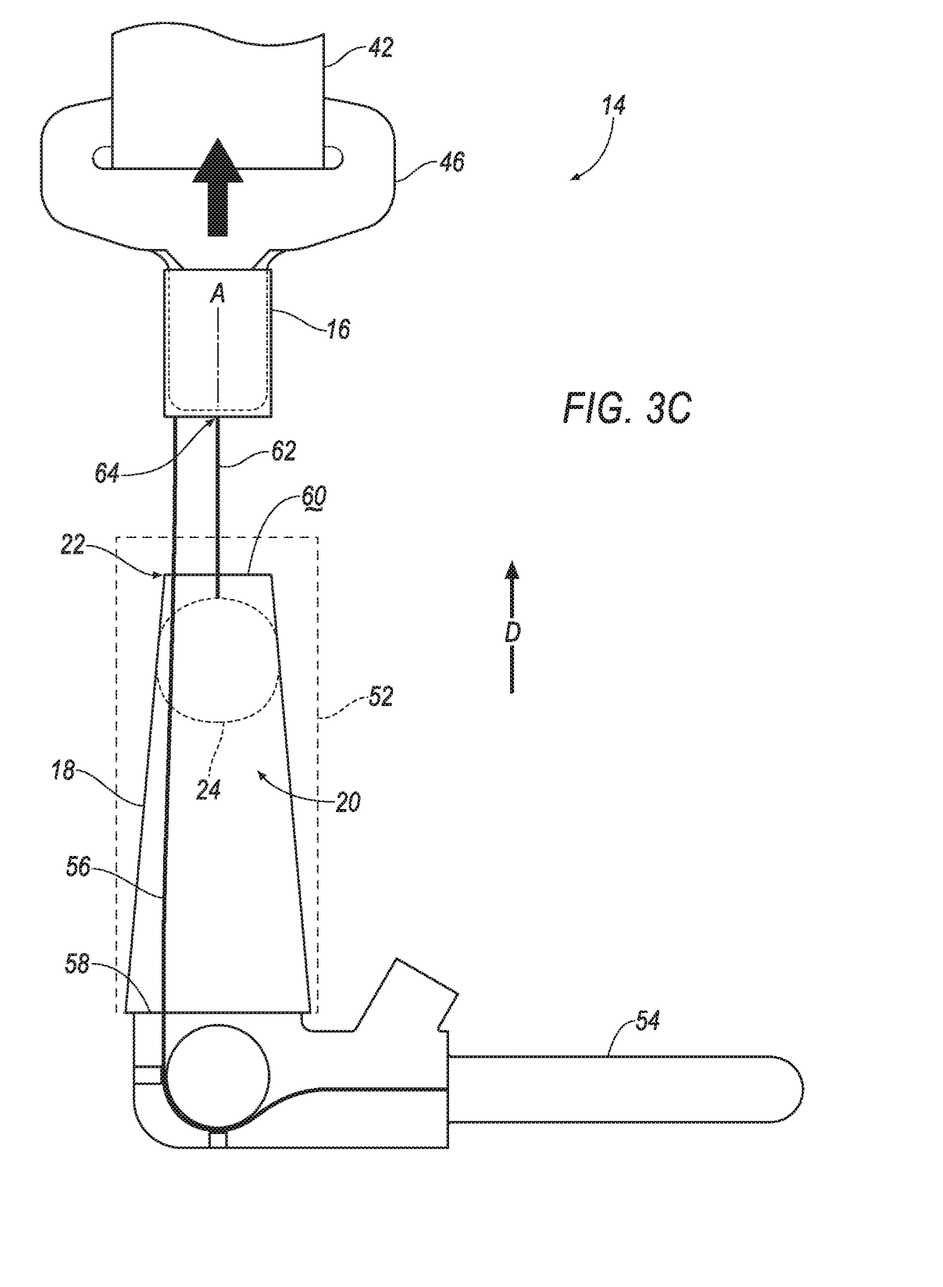
FIG. 3C is a side view of the embodiment in FIG. 3A the seatbelt buckle in the second position with the plug plastically deformed by the housing.

The housing 18 may be housed by the buckle support 52, e.g., the buckle support 52 may extend around the housing 18. The buckle support 52 may support the housing 18 when the seatbelt buckle 16 is in the first position, as shown in FIGS. 2A and 3A, and in the second position, as shown in FIGS. 2B-2C and 3B-3C. The housing 18 may be at least partially disposed in the buckle support 52. For example, the housing 18 may extend outwardly from the buckle support 52, i.e., in the upward direction D from the floor 30, as shown in FIGS. 2A-2C. As another example, the housing 18 may be fully disposed the buckle support 52, as shown in FIGS. 3A-3C.

The housing 18 may include a mouth 58 spaced from the end 22 along an axis A. The mouth 58 may be larger than the end 22 of the housing 18, i.e., the mouth 58 may extend farther from the axis A than the end 22. For example, the mouth 58 may be larger than the plug 24, e.g., have a larger diameter than the plug 24. In other words, the housing 18 may have a larger cross-section at the mouth 58 than at the end 22. As another example, the mouth 58 may be sized to receive the seatbelt buckle 16, as shown in FIG. 2A. As set forth above, the housing 18 may taper to the end 22 of the housing 18. For example, the housing 18 may taper along the axis A from the mouth 58 to the end 22. As another example, the housing 18 may taper to the end 22 from any suitable location between the mouth 58 and the end 22. The cavity 20 may extend along the axis A from the mouth 58 to the end 22 of the housing 18.

The housing 18 may have a frustum shape, e.g., conical frusta, square frusta, etc. The housing 18 may have any suitable cross section, e.g., circular, square, etc. In other words, the housing 18 may be one of a circular frustum, i.e., the cavity 20 has a circular cross section, and a right frustum, i.e., the mouth 58 and the end 22 of the housing 18 extend transverse to the axis A.

The end 22 of the housing 18 may include a wall 60 extending across the cavity 20, i.e., enclosing the end 22 of the housing 18. In other words, the wall 60 may extend transverse to the axis A. The wall 60 may include a hole (not shown) extending through the wall 60 along the axis A. The hole may be sized to retain the plug 24 in the cavity 20 of the housing 18, as set forth below. In other words, the hole may be smaller than the plug 24, e.g., the hole may have a smaller diameter than the plug 24.

The plug 24 may be disposed at any suitable location in the cavity 20, i.e., between the mouth 58 and the end 22 of the housing 18. The plug 24 may be disposed on the axis A and extend across the cavity 20 to the housing 18. In other words, the plug 24 may have an interference fit with the housing 18 when the seatbelt buckle 16 is in the first position. The plug 24 is larger than the end 22 of the housing 18, as set forth above. For example, the plug 24 may have a larger diameter than the end 22 of the housing 18. In other words, the plug 24 may extend farther from the axis than the wall 60 of the end 22 of the housing 18.

The plug 24 may have any suitable shape. For example, the plug 24 may have a circular cross-section, e.g., along the upward direction D. In this situation, the plug 24 may be a sphere, hemisphere, a cylinder, a cone, etc. Alternatively, the plug 24 may be a cube, a pyramid, a cuboid, etc. The plug 24 may be hollow. In other words, the plug 24 may be a shell encircling an internal void. Alternatively, the plug 24 may, for example, be a solid mass. In other words, the plug 24 may lack any internal voids.

The plug 24 may remain in the cavity 20 when the seatbelt buckle 16 moves from the first position to the second position. For example, the wall 60 may prevent the plug 24 from escaping the cavity 20. In this situation, the wall 60 may limit deformation of the housing 18, when the housing 18 is plastically deformed by the plug 24. Alternatively, the restraint system 14 may include a stopper (not shown) disposed in the cavity 20. The stopper may be disposed at any suitable location between the plug 24 and the end 22 of the housing 18. The plug 24 may be engageable with the stopper. For example, when the seatbelt buckle 16 moves to the second position, the plug 24 impacts the stopper. The stopper may be of any suitable type, e.g., a rib extending about the axis A from the housing 18 into the cavity 20, a wedge abutting the wall 60 of the end 22 of the housing 18, etc. The stopper may be formed of any suitable material to prevent relative movement between the end 22 of housing 18 and the plug 24 to retain the plug 24 in the cavity 20. In other words, when the plug 24 impacts the stopper, the stopper prevents further plastic deformation of one of the housing 18 and the plug 24.

The restraint system 14 may include a cable 62 attached to the plug 24 and extending to an end 64 spaced from the plug 24. The end 64 of the cable 62 may be external to the cavity 20. For example, the end 22 of the housing 18 may be disposed between the end 64 of the cable 62 and the plug 24. In this situation, the cable 62 may extend through the hole in the wall 60. The cable 62 may be formed of any suitable material, e.g., steel, aluminum, nylon, etc.

The end 64 of the cable 62 may be fixed to any suitable vehicle component. As one example, the end 64 of the cable 62 may be fixed to one of the pretensioner 54 and the seatbelt buckle 16. When the end 64 of the cable 62 is fixed to the seatbelt buckle 16, as shown in FIG. 3A, the plug 24 is fixed relative to the seatbelt buckle 16. When the end 64 of the cable 62 is fixed to the pretensioner 54, as shown in FIG. 2A, the seatbelt buckle 16 is moveable relative to the plug 24. As another example, the end 64 of the cable 62 may be fixed to the vehicle body 26, e.g., the floor 30, the B-pillar 34, etc. In this situation, the plug 24 is anchored to the vehicle body 26, i.e., the plug 24 is stationary along the axis A and rotatable about the axis A. As yet another example, the end 64 of the cable 62 may be fixed to the seat 12, e.g., a seat frame (not shown). In this situation, the plug 24 is anchored to the seat 12, i.e., the plug 24 is stationary along the axis A and rotatable about the axis A.

The cable 62 may have any suitable length. For example, the cable 62 may have slack when the seatbelt buckle 16 is in the first position, as shown in FIGS. 2A and 3A. In other words, the seatbelt buckle 16 may be spaced from the plug 24 along the axis A less than the length of the cable 62 when the seatbelt buckle 16 is in the first position. The slack may be removed during the vehicle impact by the pretensioner 54, as set forth above. When the seatbelt buckle 16 is in the second position, the cable 62 may be taut, i.e., lacking slack, as shown in FIGS. 2B-2C and 3B-3C. In other words, the seatbelt buckle 16 may be spaced from the plug 24 by the length of the cable 62.

The housing 18 may, for example, be fixed to the other of the pretensioner 54 and the seatbelt buckle 16. When the housing 18 is fixed to the seatbelt buckle 16, as shown in FIGS. 2A-2C, the housing 18 is moveable relative to the plug 24. Additionally, in this situation, the housing 18 is moveable relative to the buckle support 52. For example, the housing 18 may slide relative to the buckle support 52 from the first position, as shown in FIG. 2A, to the second position, as shown in FIGS. 2B-2C. In other words, the housing 18 may extend farther upwardly from the buckle support 52 in the second position than in the first position. When the housing 18 is fixed to the pretensioner 54, as shown in FIGS. 3A-3C, the seatbelt buckle 16 and the plug 24 are moveable relative to the housing 18. Alternatively, the housing 18 may be fixed to the vehicle body 26, e.g., the floor 30. In this situation, the housing is fixed relative to the plug 24 and the seatbelt buckle 16.

The housing 18 and the plug 24 may be formed of different materials. The housing 18 and the plug 24 may be formed of any suitable materials. The material of one of the housing 18 and the plug 24 may be more ductile than the material of the other of the housing 18 and the plug 24. In other words, one material may be plastically deformable by the other material. For example, one of the housing 18 and the plug 24 may be stainless steel and the other of the housing 18 and the plug 24 may be mild steel, aluminum, plastic, etc.

Figure 4:
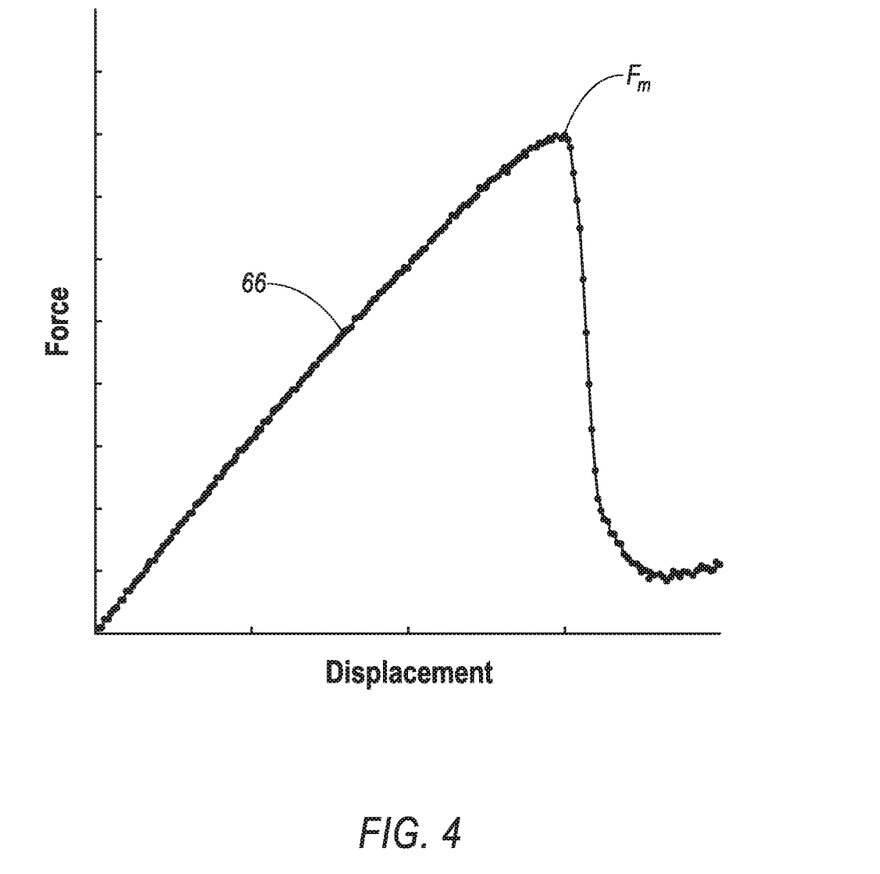
FIG. 4 is a graph of force absorbed by the restraint system versus displacement of one of the plug and the housing.

FIG. 4 is a graph of a curve 66 describing the relationship between the force absorbed by the restraint system 14 and the displacement of one of the housing 18 and the plug 24. As the displacement of one of the housing 18 and the plug 24 increases, i.e., when one of the housing 18 and the plug 24 is plastically deformed, the force absorbed by the restraint system 14 initially increases. As the displacement continues to increase, the force absorbed reaches a maximum force absorbed $F_m$ and one of the housing 18 and the plug 24 no longer plastically deforms. The maximum force absorbed $F_m$ may be an inflection point of the curve 66, that is, the point at which a change in direction of curvature of the curve 66 occurs, that is, the point separating a region of the curve 66 with increasing slope from a region of the curve 66 with decreasing slope.

With reference to FIGS. 2A and 3A, the seatbelt buckle 16 may be housed by the buckle support 52, e.g., the buckle support 52 may extend around the seatbelt buckle 16. In other words, the buckle support 52 may support the seatbelt buckle 16 in the first position. The seatbelt buckle 16 may be partially disposed in the buckle support 52. For example, the seatbelt buckle 16 may extend outwardly from the buckle support 52, i.e., in the upward direction D from the floor 30. The seatbelt buckle 16 may be moveable relative to the buckle support 52. For example, the seatbelt buckle 16 may slide relative to the buckle support 52 from the first position to the second position. The seatbelt buckle 16 may extend farther upwardly from the buckle support 52 in the second position than in the first position.

With reference to FIG. 1, the seatbelt buckle 16 may be disposed in any suitable position relative to the seat bottom 38. For example, the seatbelt buckle 16 may be disposed below the seat bottom 38. In other words, the seatbelt buckle 16 may be disposed between the seat bottom 38 and the floor 30 of the vehicle 10. Alternatively, the seatbelt buckle 16 may extend partially above the seat bottom 38. In other words, the seat bottom 38 may be disposed between a portion of the seatbelt buckle 16 and the floor 30 of the vehicle 10.

With reference to FIGS. 2A-2C, the seatbelt buckle 16 may be disposable in the cavity 20 of the housing 18. In other words, the cavity 20 of the housing 18 may be sized to receive the seatbelt buckle 16. In this situation, the seatbelt buckle 16 may be fixed to the housing 18 in the cavity 20. Specifically, the seatbelt buckle 16 may be fixed to the mouth 58 of the housing 18. The seatbelt buckle 16 may be fixed to the housing 18 by any suitable manner, e.g., fasteners, welding, etc.

When the seatbelt buckle 16 moves from the first position to the second position, the plug 24 moves relative to the housing 18 toward the end 22 of the housing 18, as set forth above. For example, the plug 24 is closer to the end 22 of the housing 18 when the seatbelt buckle 16 is in the second position as compared to when the seatbelt buckle 16 is in the first position. When the seatbelt buckle 16 is fixed relative to the housing 18, the end 22 of the housing 18 is disposed between the plug 24 and the seatbelt buckle 16, as shown in FIGS. 2A-2C, e.g., the end 22 of the housing 18 may be adjacent the pretensioner 54. In this situation, the end 22 of the housing 18 moves along the axis A, e.g., in the upward direction D, toward the plug 24 during movement of the seatbelt buckle 16 from the first position to the second position. When the seatbelt buckle 16 is fixed relative to the plug 24, the plug 24 is disposed between the end 22 of the housing 18 and the seatbelt buckle 16, as shown in FIGS. 3A-3C, e.g., the end 22 of the housing 18 may be adjacent the seatbelt buckle 16. In this situation, the plug 24 moves along the axis A, e.g., in the upward direction D, toward the end 22 of the housing 18 during movement of the seatbelt buckle 16 from the first position to the second position.

When the seatbelt buckle 16 moves from the first position to the second position, one of the housing 18 and the plug 24 is plastically deformed by the other of the housing 18 and the plug 24, as set forth above. For example, when the housing 18 is deformed by the plug 24, the housing 18 may expand away from the axis A as the plug 24 interferes with the housing 18, e.g., along the taper of the housing 18, during movement of the seatbelt buckle 16 from the first position to the second position, as shown in FIGS. 2B and 3B (the original shape of the housing 18 is shown in hidden lines in FIGS. 2B and 3B). Alternatively, when the plug 24 is deformed by the housing 18, the plug 24 may be compressed by the housing 18 towards the axis A during movement of the seatbelt buckle 16 from the first position to the second position, as shown in FIGS. 2C and 3C. In other words, the housing 18 may compress the plug 24 such that the plug 24 has an oval cross section, e.g., along the upward direction D, when the seatbelt buckle 16 is in the second position.

The occupant may occupy the seat 12 with the seatbelt buckle 16 in the first position under normal operation conditions, i.e., not a vehicle impact. During the vehicle impact, the vehicle 10 may be subjected to an impact force. The impact force may cause the vehicle 10 to decelerate faster than the occupant. During the vehicle impact, the restraint system 14 may increase the tension on the webbing 42, e.g., the retractor 40 may be in the locked state, to retain the occupant on the seat 12. In this situation, the momentum of the occupant may cause the restraint system 14, e.g., the webbing 42, to exert the force on the occupant. When the restraint system 14 exerts the force on the occupant, the seatbelt buckle 16 may move from the first position to the second position. When the seatbelt buckle 16 moves, the seatbelt buckle 16 may pull one of the housing 18 and the plug 24 along the axis A relative to the other of the housing 18 and the plug 24. In other words, one of the housing 18 and the plug 24 may be fixed relative to the seatbelt buckle 16. The other of the housing 18 and the plug 24 may be fixed relative to the pretensioner 54. As the plug 24 moves relative to the housing 18 toward the end 22 of the housing 18, the plug 24 interferes with the housing 18 since the plug 24 is larger than the end 22 of the housing 18. In this situation, one of the plug 24 and the housing 18 is plastically deformed by the other of the plug 24 and the housing 18. For example, the plug 24 may be compressed by the housing 18 such that the cross-sectional shape of the plug 24 is changed, e.g., from a circle to an oval. As another example, the housing 18 may expand away from the axis A along the taper of the housing 18 as the plug 24 and the housing 18 interfere with each other during movement from the first position to the second position. The housing 18 may retain the plug 24 in the cavity 20 when the seatbelt buckle 16 is in the second position, e.g., with the stopper, by interference fit with the wall 60 of the end 22, etc. When one of the plug 24 and the housing 18 is plastically deformed, the one of the plug 24 and the housing 18 may absorb energy of the force exerted on the occupant by the restraint system 14. In this situation, the restraint system 14 may assist in reducing the force exerted on the occupant and injuries to the occupant.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
a housing defining a cavity tapering to an end;
a plug disposed in the cavity and being larger than the end of the housing;
a seatbelt buckle fixed relative to one of the housing and the plug and moveable from a first position to a second position relative to the other of the housing and the plug, the plug being moveable relative to the housing toward the end during movement from the first position to the second position;
one of the housing and the plug being plastically deformable by the other of the housing and the plug during movement from the first position to the second position;
a cable attached to the plug and extending to an end spaced from the plug; and
a pretensioner spaced from the plug, the end of the cable being fixed to one of the pretensioner and the seatbelt buckle.

2. The restraint system of claim 1, wherein the end of the cable is external to the cavity.

3. The restraint system of claim 1, wherein the end of the housing is disposed between the plug and the end of the cable.

4. The restraint system of claim 1, further comprising a vehicle body, the seatbelt buckle being moveable from the first position to the second position relative to the vehicle body.

5. The restraint system of claim 1, wherein the housing is fixed relative to the other of the pretensioner and the seatbelt buckle.

6. The restraint system of claim 1, wherein the pretensioner includes a linkage connected to one of the housing and the seatbelt buckle.

7. The restraint system of claim 1, wherein the housing has a frustum shape.

8. The restraint system of claim 1, wherein the seatbelt buckle is disposable in the cavity.

9. The restraint system of claim 1, wherein the end of the housing includes a wall extending across the cavity, the wall includes a hole extending into the cavity.

10. The restraint system of claim 9, wherein the cable extends from the plug through the hole in the wall.

11. The restraint system of claim 1, wherein the housing includes stopper disposed between the plug and the end of the housing, the plug being engageable with the stopper.

12. The restraint system of claim 1, wherein the plug is hollow.

13. The restraint system of claim 1, wherein the plug has a circular cross-section.

14. The restraint system of claim 13, wherein the plug is a sphere.

15. The restraint system of claim 13, wherein the plug is a cylinder.

16. The restraint system of claim 1, wherein the plug and the housing are formed of different materials, the material of one of the plug and the housing being more ductile than the material of the other of the plug and the housing.

17. The restraint system of claim 1, further comprising a webbing engageable with the seatbelt buckle.

18. The restraint system of claim 17, further comprising a clip slidably engaged with the webbing and releasably engageable with the seatbelt buckle.

19. A restraint system comprising:
a housing defining a cavity tapering to an end;
a plug disposed in the cavity and being larger than the end of the housing;
a seatbelt buckle fixed relative to one of the housing and the plug and moveable from a first position to a second position relative to the other of the housing and the plug, the plug being moveable relative to the housing toward the end during movement from the first position to the second position;
one of the housing and the plug being plastically deformable by the other of the housing and the plug during movement from the first position to the second position;
a cable attached to the plug extending to an end spaced from the plug, the end of the cable being external to the cavity; and
a vehicle body, the seatbelt buckle being moveable from the first position to the second position relative to the vehicle body;
wherein the end of the cable is fixed to the vehicle body.

20. A restraint system comprising:
a housing defining a cavity tapering to an end;
a plug disposed in the cavity and being larger than the end of the housing;

a seatbelt buckle fixed relative to one of the housing and the plug and moveable from a first position to a second position relative to the other of the housing and the plug, the plug being moveable relative to the housing toward the end during movement from the first position to the second position; and one of the housing and the plug being plastically deformable by the other of the housing and the plug during movement from the first position to the second position;

wherein the seatbelt buckle is disposable in the cavity.

\* \* \* \* \*